United States Patent Office 3,448,094
Patented June 3, 1969

3,448,094
POLYMERS OF ALKYL METHACRYLATES AND IMIDES
Morris Zief and Charles H. Schramm, Easton, Pa., assignors to J. T. Baker Chemical Company, Phillipsburg, N.J., a corporation of New Jersey
No Drawing. Filed Nov. 17, 1965, Ser. No. 508,362
Int. Cl. C08f *19/00, 27/00*
U.S. Cl. 260—86.1          3 Claims

ABSTRACT OF THE DISCLOSURE

Discloses novel polymers and method of preparation by: (a) heating, in the presence of a free radical producing catalyst, at a temperature of about 40° C. to 75° C. a mixture of an alkyl methacrylate and an imide of the formula

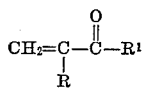

wherein R is hydrogen or methyl and $R^1$ is a cyclic imino group of the formula

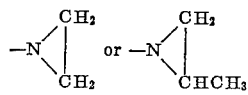

to polymerize said alkyl methacrylate and imide through the vinyl groups thereof while a major portion of the cyclic imino groups remain unreacted; and (b) further heating said polymer having free imino groups either alone or with a carboxylic acid at a temperature above 75° C. to further cause reaction and polymerization through the cyclic imino groups.

---

This invention relates to polymerization products of alkyl methacrylates with certain acrylyl or methacrylylimides. More particularly this invention relates to alkyl methacrylates polymerized with minor quantities of imides of the formula:

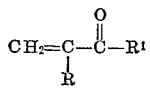

wherein R is hydrogen or methyl and $R^1$ is a cyclic imino group of the formula:

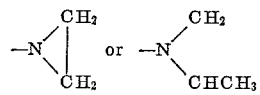

Illustrative of the imides as represented by the above formula there can be mentioned acrylyl ethyleneimide; acrylyl propyleneimide; methacrylyl propyleneimide; and methacrylyl ethyleneimide

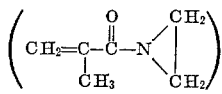

It has now been found that the alkyl methacryrlates and the above imides can be polymerized to form polymers having highly useful properties.

The polymers of this invention are useful for the production of plastic articles by extruding, molding and casting. Sheets, rods, tubes, lenses and massive pieces can be formed. The imide reactant has two reactive sites, namely the vinyl group and the cyclic imino group. By first polymerizing the alkyl methacrylate and imide monomers through the vinyl groups, an interpolymer is formed which has free (unreacted) imino groups which can be further reacted with monomers or polymers having free carboxylic acid groups, e.g. acrylic acid or methacrylic acid; also the free imino groups can react with the interpolymer to cross link the methacrylate-imide interpolymer without the addition of carboxylic acids. The interpolymers of the alkyl methacrylate and imide monomer having unreacted cyclic imino groups are preferably admixed with monomers or polymers having free carboxylic acid groups and applied as a coating to metals, e.g. steel. The mixture is then baked to react the carboxylic acid group with the cyclic imino group to form a protective coating for the metal.

Polymers prepared from alkyl methacrylates copolymerized with minor quantities of methacrylyl ethyleneimide have substantially higher heat distortion temperatures than the homopolymers of alkyl methacrylates. The novel polymers retain most of the advantageous features of homopolymerized alkyl methacrylates while substantially raising the heat distortion temperature of the polymer. Illustratively, the polymer prepared by copolymerizing a mixture containing 90 parts of methyl methacrylate and 10 parts of methacrylyl ethyleneimide had a heat distortion temperature 40° C. higher than the homopolymer of methyl methacrylate. In such compositions, the methacrylyl ethyleneimide is employed as a minor quantity based on the total weight of methacrylyl ethyleneimide and lower alkyl methacrylate monomers, e.g. the polymer will generally contain from 0.5 to 49 parts of methacrylyl ethyleneimide for each 50 parts of the methyl methacrylate. The term "parts" as used herein refers to parts by weight. Preferably, the polymer contains from about 2 to 15 parts of the imide, copolymerized with about 50 parts of the methyl methacrylate and particularly the polymer consists essentially of from about 85 to 95 parts of lower alkyl methacrylate copolimerized with about 5 to 15 parts of methacrylyl ethyleneimide. Minor quantities of other polymerizable materials can be copolymerized with the lower alkyl methacrylate and methacrylyl ethyleneimide, in forming the high heat distortion polymers, in quantities which can vary over a broad range.

Illustratively, such polymers can contain from about 0.5% to about 15% by weight or smaller quantities such as that of from about 1 to 10%, of other copolymerizable monomers based on the total weight of the two essential monomers. Such additional polymerizable materials can be acrylonitrile, methacrylonitrile, fumaronitrile, styrene, alpha-methyl styrene, and the like.

The interpolymers of an alkyl methacrylate and an imide monomer wherein the interpolymer contains unreacted imino groups are particularly suitable as coating compositions or components of coating compositions which can be applied to metals or other articles and then baked to a durable finish. For such use, the cyclic imino groups of the alkyl methacrylate-imide interpolymer have not been reacted or at least a major portion thereof have not been reacted, in the preparation of the interpolymer. Conventional techniques, additives and diluents, e.g. butanol, can be employed in formulating the coatings. For such use, the interpolymer contains the polymerization product of about 0.5 to 49 parts of the imide for each 50 parts of of the methacrylate and preferably from about 2 to 15 parts of the imide for each 50 parts of the methacrylate. The interpolymer having the cyclic imino groups is preferably formulated with monomers or polymers having free carboxylic acid groups. Since one carboxylic acid group reacts with each imino group, stoichiometric quantities of these materials are employed although the molar ratio of one to the other can vary from 0.5 to 2. The temperature at which the interpolymer or interpolymer and carboxylic acid containing material is baked on the metal can vary over a wide range such as that of from about 150° to 350° C.

The alkyl methacrylate monomer employed in this invention is preferably a lower alkyl methacrylate, i.e. one having from 1 to 4 carbon atoms in the alkyl group, e.g. methyl, ethyl, n-propyl, isopropyl, n-butyl, isobutyl, t-butyl, and sec-butyl methacrylates. Methyl methacrylate is the preferred alkyl methacrylate.

The interpolymers of this invention having unreacted cyclic imino groups can be prepared by mixing together the lower alkyl methacrylate and imide monomers in the proportions set forth in the compositions of this invention and conducting the polymerization through the vinyl groups by conventional techniques. The polymerization can be conducted with or without added solvents, e.g. butanol. It is preferred that this polymerization take place in the presence of a polymerization catalyst. Suitable catalysts are free radical producing catalysts, for example, organic peroxides, persulfates, oxonides, metal alkyls, diazonium salts, diazotates, hydrazines, and amine oxides. Illustrative of such catalysts there can be mentioned benzoyl peroxide, ditertiary butyl peroxide, tertiary butyl hydroperoxide, diacetyl peroxide, $\alpha,\alpha'$-azodiisobutyronitrile, p-bromobenzene-diazonium fluoborate, azomethane, phenyldiazonium halides, diazoaminobenzenes, and the like. The polymerization catalyst is used in small but catalytically effective amounts, e.g., in a concentration of about 0.01% to 0.8% by weight based on the total monomers. In the polymerization of the vinyl groups the polymerization mixture is heated sufficiently to effect such polymerization but not to break and react the cyclic imino groups. Suitable temperatures can range from about 40° C. to 75° C. and preferably from about 45° C. to 70° C.

In general, it is desirable to convert the monomers charged as completely as possible to the interpolymer. Under these circumstances, the overall composition of the polymer obtained will be substantially similar to that of the mixture of monomers charged. At lower conversions, however, the composition of the copolymer can differ significantly from that of the mixture of monomers charged. This will depend on the degree of conversion, the reactiveness of the individual monomers, and the ratio of the monomers in the charge. These matters are easily determinable by simple experimentation. Should any unreacted monomer remain in the polymerization product, it can be removed by conventional techniques such as solvent extraction.

If it is desired to also react the cyclic imido groups of the interpolymer, the temperature of the polymerization mixture is raised above 70° C. or 75° C., e.g., up to 150° C. The reaction time can vary over a broad range depending on the catalyst, monomers and temperature employed. A reaction time from about 8 to 16 hours however is suitable. Otherwise, the interpolymer is recovered from the reaction mixture and can be subsequently further heated or baked, either alone or with monomers or polymers having free carboxylic acid groups to further cause reaction through the cyclic imino groups.

The following examples are illustrative of the invention:

Example 1

Methyl methacrylate (9 g.), methacrylyl ethyleneimide (1 g.) and 10 mg. of azo-bis-isobutyronitrile were mixed thoroughly and placed under nitrogen in a stainless steel mold. The mold was maintained at 65° C. for 16 hours, then at 117° C. for 90 hours. Upon cooling, the bar was easily removed when mold was coated with Teflon or stearic acid. Silicone release agents dissolved in the bar and afforded cloudy moldings. With stearic acid transparent bars, off-white, were obtained. Upon testing by ASTM Method D648 (264 p.s.i.), the bars had a heat distortion of 135.5° C.

Example 2

A casting mix was prepared from 30 g. of Plexiglas molding powder [1] dissolved in inhibitor-free methyl methacrylate monomer (150 g.). In 90–10 mixtures of this casting mix and methacrylyl ethyleneimide, heat distortion values of 130–133° C. were obtained under the conditions described in Example 1. In order to prepare bubble-free bars from methyl methacrylate and methacrylyl ethyleneimide, the polymerization should preferably proceed slowly at the start. In the persence of 0.1% azo-bis-isobutyronitrile no reaction took place at 47° C. in 6 hours. Substantial polymerization took place at 55° C. in 16 hours. A 24-hour period at 55° C. was, therefore, used for the first cycle in some polymerizations followed by a second cycle at 65° C. for 24 hours. After 16 hours at 55° C., 90% of the copolymer was insoluble in chloroform. With methyl methacrylate itself under the same conditions, 86% of polymer was soluble in chloroform.

Example 3

Ninety parts of methyl methacrylate, 5 parts of alpha-methyl styrene, 5 parts of methacrylyl ethyleneimide, and 0.005 part of azo-bis-isobutyronitrile were mixed thoroughly and placed under nitrogen in a stainless steel mold. The mold was maintained at 45° C. for 24 hours, then at 65° C. for 64 hours and finally at 100° C. for 48 hours. Upon cooling, a clear bar was removed from the mold. The bar had a heat distortion temperature of 124° C. (ASTM Method D648 at 264 p.s.i.).

Example 4

Ninety parts of methyl methacrylate, 5 parts of styrene, 5 parts of methacrylyl ethyleneimide and 0.005 part of azo-bis-isobutyronitrile were mixed thoroughly and placed under nitrogen in a stainless steel mold. The mold was maintained at 45° C. for 24 hours, then at 65° C. for 64 hours, and finally at 100° C. for 48 hours. Upon cooling, a clear bar was removed from the mold. The bar had a heat distortion temperature of 126° C. when tested by ASTM Method D648 (264 p.s.i.).

Example 5

By following the method of Example 1, castings can be produced by substituting an equal quantity of methacrylyl propyleneimide or acrylyl ethyleneimide for the methacrylyl ethyleneimide.

Example 6

Nine parts of methyl methacrylate, 1 part of methacrylyl ethyleneimide, and 0.01 part of azo-bis-isobutyronitrile and 10 parts of butanol are mixed thoroughly and placed under nitrogen in a stainless steel mold. The mold is maintained at 65° C. for 12 hours to prepare the interpolymer. The mold is then permitted to cool. A major portion of the cyclic imino groups of the interpolymer are in the free unreacted state. The contents of the mold are then mixed with 6 parts of methyl methacrylate, 3 parts of ethyl acrylate and 1 part of methacrylic acid. The mixture is coated over a flat piece of steel and then baked at 300° C. for 30 minutes. A hard durable coating of the mixture is formed on the metal.

What is claimed is:
1. A cross-linkable composition consisting essentially of a vinyl polymerized monomeric mixture of a lower alkyl methacrylate and an imide of the formula:

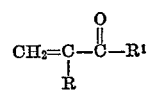

[1] Methyl methacrylate molding powder sold by Rohm and Haas Co.

wherein R is a member selected from the group consisting of hydrogen and methyl and $R^1$ is an imino member selected from the group consisting of a

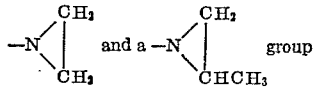

said composition consisting essentially of 5 to 15 parts of said imide and 85 to 95 parts of said methacrylate polymerized in the composition, a major portion of the imino groups of said imide in the polymerized composition being in the original cyclized and unreacted state, said vinyl polymerized composition prepared by heating said monomers in the presence of a free radical producing catalyst at a temperature of about 45° C to 70° C.

2. A composition of claim 1 wherein R is methyl and $R^1$ is the group

3. A cross-linked polymer prepared by heating the cross-linkable composition of claim 1 at a temperature above 75° C. to cause cross-linking through the cyclic imino groups.

References Cited

UNITED STATES PATENTS

| | | |
|---|---|---|
| 3,017,280 | 1/1962 | Yudelson. |
| 2,830,045 | 4/1958 | Leumann et al. ____ 260—88.3 |
| 3,251,812 | 5/1966 | Hsieh _____ 260—88.3 |
| 3,290,416 | 12/1966 | Christenson et al. ___ 260—86.1 |

OTHER REFERENCES

Schildknecht: Vinyl and Related Polymers, John Wiley & Sons, Inc., New York (1959), pp. 207–211.

HARRY WONG, JR., *Primary Examiner.*

U.S. Cl. X.R.

117—132; 260—33.4, 80.72